J. S. TAYLOR.
Butter-Cutters.

No. 153,730.

Patented Aug. 4, 1874.

Witnesses:
A. C. Cassell
W. E. Chaffee

Inventor:
Jas. S. Taylor,
by his atty. Clayton & Co.

UNITED STATES PATENT OFFICE.

JAMES S. TAYLOR, OF DANBURY, CONNECTICUT.

IMPROVEMENT IN BUTTER-CUTTERS.

Specification forming part of Letters Patent No. 153,730, dated August 4, 1874; application filed June 13, 1874.

*To all whom it may concern:*

Be it known that I, JAMES S. TAYLOR, of Danbury, in the county of Fairfield and in the State of Connecticut, have invented certain new and useful Improvements in Butter-Cutters; and I do hereby declare that the following is a full, clear, and exact description thereof, reference being had to the accompanying drawings, and to the figures and letters of reference marked thereon, making with this a complete specification.

The object of my invention is to provide a gaging and stamping implement for cutting pats of butter, from a firkin or other large measure, of a certain size or sizes, containing certain weight, so as to combine rapidity of formation with neatness of form in cutting pats of butter.

The nature of my invention consists in the construction of a hollow cubical box, with one end open as a mouth with beveled edges, and the opposite end or top provided with a hollow vertical handle, into which handle there slides the handle of an adjustable follower, whose head serves as a movable top for the box. By these means the size of the pat of butter is determined, and the pat is cut after it has been formed by a small wire stretched across the mouth of the box secured to the ends of levers pivoted on opposite sides of the box, with their lower ends united above the top of the box as a handle, and by means of which the small wire is swept across the mouth of the box so as to sever the pat from the mass of butter; and also, in having the follower removable from the box to serve as a knife-paddle; all of which will more fully hereinafter appear.

To enable others skilled in the art to make and use my invention, I will proceed to more specifically describe its construction and operation.

Figure 1:
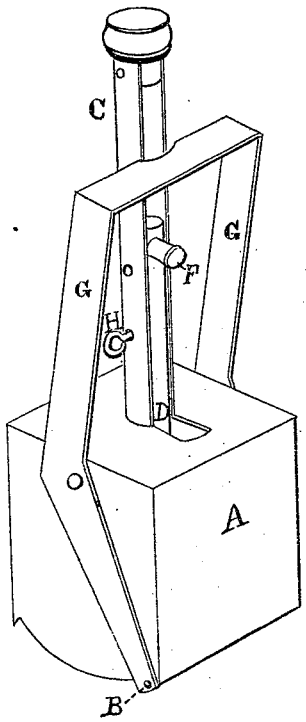
Figure 2:
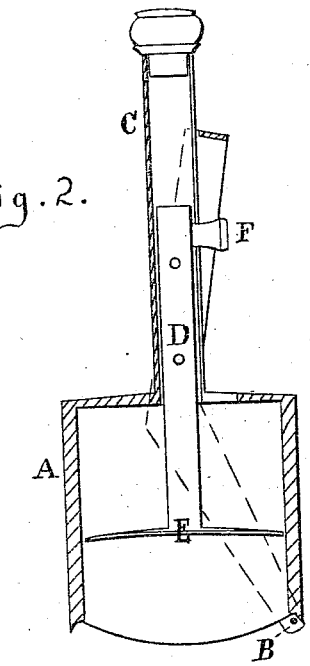
Figure 3:
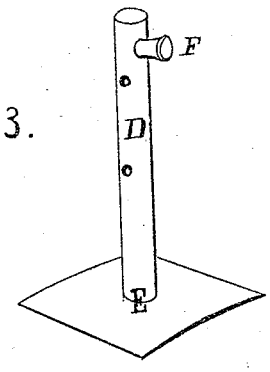

In the drawings, Figure 1 is a perspective view of my invention; Fig. 2 is a vertical section through the center of the same, and Fig. 3 is a detail view of the follower or knife-paddle.

A is the hollow cubical box with its mouth's edges beveled as indicated in Fig. 2. Two of these opposite edges are horizontal, and two are slightly curved to conform to the arc described by the wire B. One of these edges is clearly shown in Fig. 2. C is the handle, secured to the top of the box, by means of which the box is forced into the mass of butter from which the pat is to be cut. It is hollow, and slotted on one side to receive the handle D of the follower E, which has a handle, F, the follower passing up through a hole in the top of the box. G G are the levers, pivoted to opposite sides of the box, as clearly illustrated in Figs. 1 and 2. To their lower ends is secured the wire B, that is stretched across the mouth of the box. One or both of the edges parallel with the wire B are beveled sufficiently to permit the wire to fit close against the edge and allow the follower E to be easily put in or removed from the box. There are holes passing through the handle C at graduated distances apart to receive a pin, H, by means of which the follower can be quickly adjusted to regulate the various weights indicated by the several positions of the pin H, as the pin passes through the follower's handle and firmly secures it. The head of the follower may have any suitable design of characters or shapes, or both, to impress upon the butter pat.

The form of the box has been described as cubical, but any other parallelopiped form would answer.

When the implement has been constructed as above described, it is operated by securing the follower E with the pin H, at the hole indicating the desired size and weight of the pat of butter, in the handle D of the box, and then forcing the mouth of the box down into the firkin or other mass of butter until the head of the follower prevents it from going any deeper than is necessary to fill that part of the box below the follower. By moving the levers G G at their ends where they unite, the wire B will sweep across the mouth of the box and cut the pat of butter, and then it can be lifted from the firkin. The pin is then removed, and the handle of the follower thus being freed, the follower is forced, by its knob F on its handle D, down, so as to force with its head the pat of butter from the box ready for use. The butter-cutter can then be again set and operated as just described.

Having thus fully described my invention, what I claim as new, and desire to secure by Letters Patent, is—

A butter-cutter, consisting of a vertically-moving case of thin material, which cuts in its descent, an interior follower to compress and eject the butter, and a pivoted frame which carries the excising wire or blade upon a curved line corresponding to the formation of the lower extremity of the sides of the vertical case, substantially as set forth, and for the purposes specified.

In testimony that I claim the above-described certain new and useful improvements in butter-cutters, I have hereunto signed my name this 25th day of May, 1874.

JAMES S. TAYLOR.

Witnesses:
    WILLIE J. TAYLOR,
    ELLA S. TROWBRIDGE.